United States Patent
Weiss et al.

(10) Patent No.: US 7,398,749 B2
(45) Date of Patent: Jul. 15, 2008

(54) METHOD AND DEVICE FOR CONTROLLING AN INTERNAL COMBUSTION ENGINE

(75) Inventors: Frank Weiss, Pentling/Grasslfing (DE); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 308 days.

(21) Appl. No.: 10/549,019

(22) PCT Filed: Nov. 10, 2004

(86) PCT No.: PCT/EP2004/052906

§ 371 (c)(1),
(2), (4) Date: Sep. 15, 2005

(87) PCT Pub. No.: WO2005/054648

PCT Pub. Date: Jun. 16, 2005

(65) Prior Publication Data

US 2006/0196479 A1   Sep. 7, 2006

(30) Foreign Application Priority Data

Dec. 2, 2003   (DE) ................................ 103 56 257

(51) Int. Cl.
*F01L 1/34* (2006.01)

(52) U.S. Cl. .................. 123/90.16; 123/305; 123/345; 123/436

(58) Field of Classification Search .............. 123/90.15, 123/90.16, 90.17, 90.18, 305, 345, 346, 399, 123/436, 403, 404

See application file for complete search history.

(56) References Cited

U.S. PATENT DOCUMENTS

| 5,558,076 | A |   | 9/1996 | Maki et al. |
| 5,685,275 | A |   | 11/1997 | Djordjevic |
| 5,724,927 | A | * | 3/1998 | Suzuki .................... 123/90.15 |
| 6,055,948 | A |   | 5/2000 | Shiraishi et al. |
| 6,499,469 | B2 |   | 12/2002 | Ogawa et al. |
| 6,681,741 | B2 | * | 1/2004 | Majima et al. .............. 123/399 |
| 6,739,296 | B2 | * | 5/2004 | Machida .................. 123/90.16 |

FOREIGN PATENT DOCUMENTS

| DE | 196 26 783 A1 | 1/1997 |
| EP | 0 728 923 B1 | 8/1996 |
| EP | 0 854 280 A1 | 7/1998 |
| EP | 1 179 666 B1 | 2/2002 |
| EP | 1 234 967 A2 | 8/2002 |
| EP | 1 338 778 A1 | 8/2003 |
| EP | 1 350 936 A2 | 10/2003 |
| JP | 08158910 A | 6/1996 |

* cited by examiner

*Primary Examiner*—Ching Chang

(57) ABSTRACT

The invention relates to a method and device for controlling an internal combustion engine comprising an inlet pipe leading to a cylinder input where a gas input valve is placed. Said engine also comprises a drive for the gas input valve which makes it possible to adjust a gas input valve lift for at least two values. The engine also comprises an injection valve for metering fuel and a spark plug which controls the crankshaft angle of air-fuel mixture ignition. Said internal combustion engine is controlled in a following manner: a fuel is metered at least once during the intake stroke of a cylinder when the valve lift (VL) passes from one value to the other and at least one final injection is carried out in a dosing manner only when the valve lift (VL) is really carried out.

9 Claims, 5 Drawing Sheets

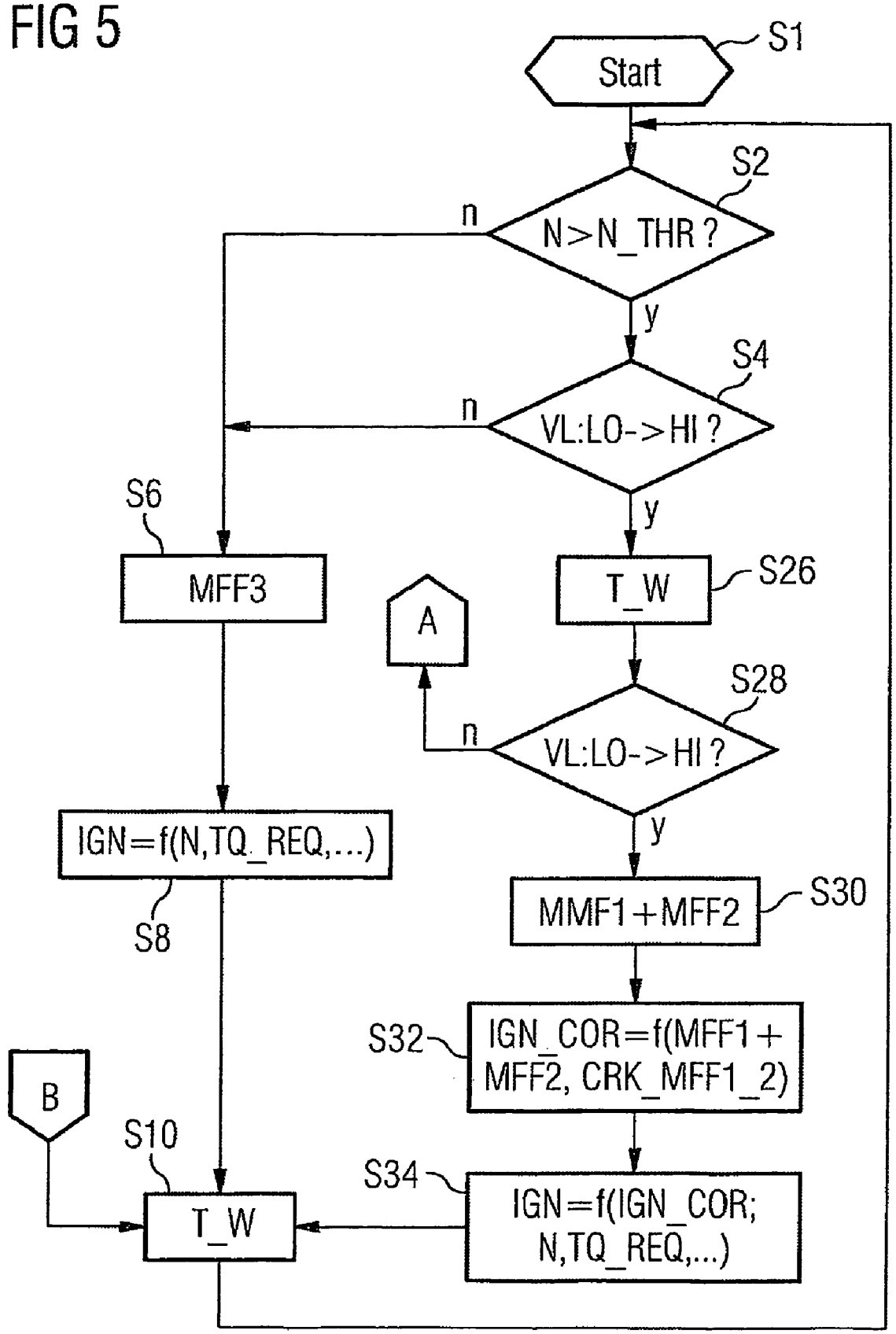

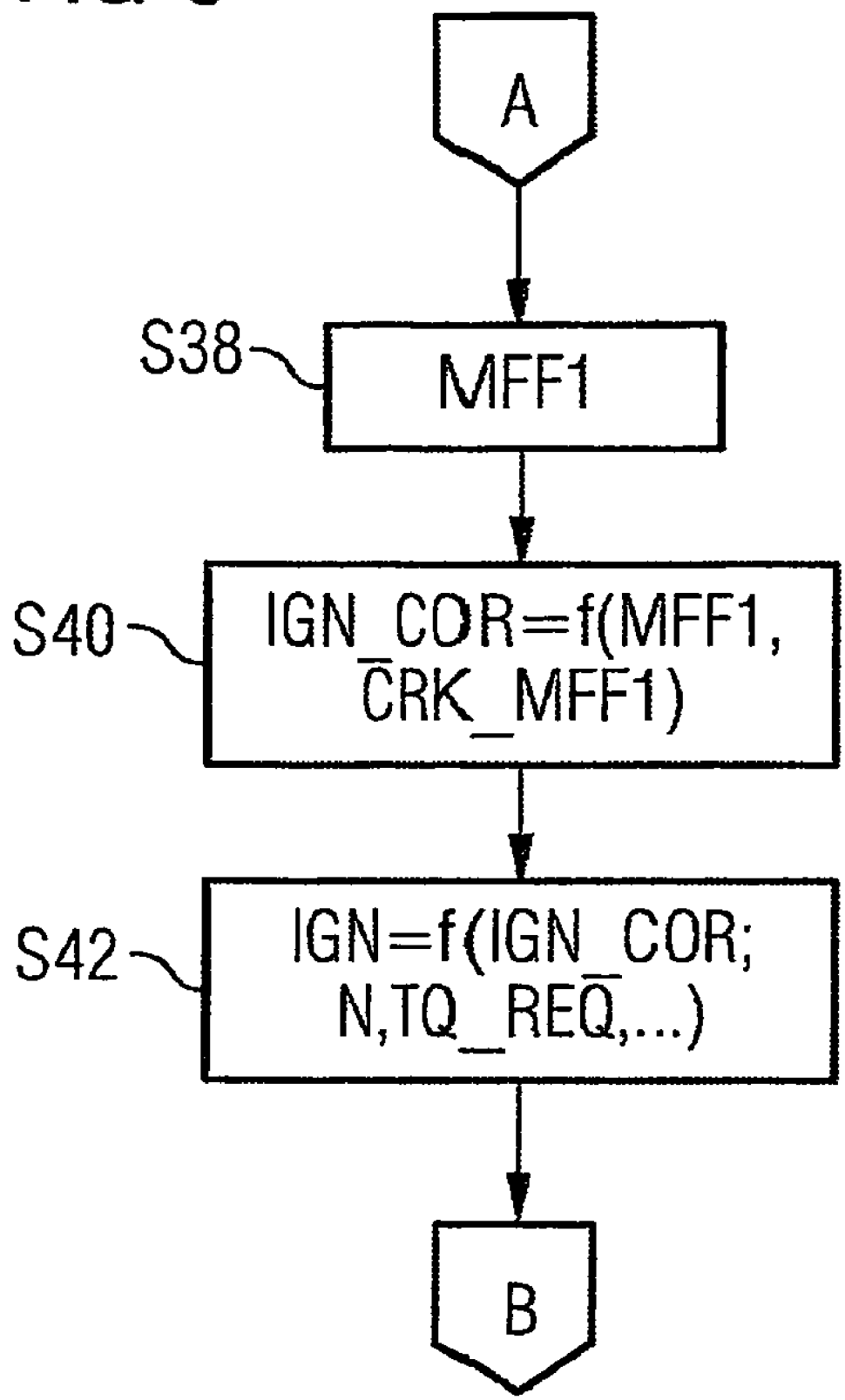

METHOD AND DEVICE FOR CONTROLLING AN INTERNAL COMBUSTION ENGINE

CROSS REFERENCE TO RELATED APPLICATION

This application is the US National Stage of International Application No. PCT/EP2004/052906, filed Nov. 10, 2004 and claims the benefit thereof. The International Application claims the benefits of German Patent applications No. 10356257.5 DE filed Dec. 2, 2003, all of the applications are incorporated by reference herein in their entirety.

FIELD OF THE INVENTION

The invention relates to a method and device for controlling an internal combustion engine

BACKGROUND OF THE INVENTION

Increasingly high demands are made on internal combustion engines with regard to their performance and efficiency. At the same time, because of stringent legal regulations, the emissions must also be low. Such requirements can be met properly if the internal combustion engine is equipped with gas-changing valves and corresponding drives for this internal combustion engine in which the valve lift curve differs depending on the operating point of the internal combustion engine. Because of this, throttle losses in the case of air intake can be reduced and, if required, higher exhaust gas recirculation rates can quickly be set.

Adjusting the valve lift of a gas intake valve of the internal combustion engine between a lower and a higher valve lift is known. The Porsche 911 Turbo for example is thus equipped with a device for adjusting the valve lift of the gas intake valve and the gas outlet valve. In addition, the internal combustion engine of this vehicle is provided with a camshaft on which for each gas intake valve, one cam with a lower lift and two additional cams with a higher lift are embodied. The cam lift is transferred by means of a transfer unit to the gas intake valve. The transfer unit is embodied as a cup-shaped tappet comprising a cylinder element and a ring cylinder element arranged concentrically to this cylinder element. The cam with a lower lift acts on the cylinder element while the cams with the higher lift act on the ring cylinder element. Depending on a switch position of the cup-shaped tappet, either the lower or the higher lift is transferred to the gas intake valve. While the internal combustion engine is idling, the lower cam lift is transferred to the gas intake valve. This results in lower frictional losses based on the small diameter of the cam and the cylinder element used in this mode of operation and the lower valve lift.

In addition, a higher loading movement is achieved. This enables the emissions of the internal combustion engine to be decreased and at the same time, the fuel consumption to be kept low. The lower valve lift is maintained in the case of a lower and average load. Throttle losses can also be reduced by a corresponding phase adjustment between the gas intake valve and the gas outlet valve and a resulting internal exhaust gas recirculation rate. In the case of higher load requirements made on the internal combustion engine, the valve lift passes to the higher value. For a high driving comfort of a vehicle in which such an internal combustion engine is arranged and for low emissions of noxious substances, it is important that the passage from the lower valve lift to the higher valve lift takes place without misfiring.

SUMMARY OF THE INVENTION

The object of the invention is to create a method and a device for controlling an internal combustion engine which ensures that low emissions of noxious substances are generated.

The object of the invention is solved by the features of the independent patent claims. Advantageous embodiments of the invention are characterized in the subclaims.

The invention is characterized by a method and a corresponding device for controlling an internal combustion engine comprising an intake pipe leading to a cylinder intake where a gas intake valve is placed. Said engine also comprises a drive for the gas-changing valve, which makes it possible to set a gas intake valve lift for at least two values. The engine also comprises an injection valve for metering the fuel and a spark plug which controls the crankshaft angle of the air/fuel mixture ignition. Said internal combustion engine is controlled in the following manner: fuel is metered at least once during the intake stroke of a cylinder, when the valve lift passes from one value to the other and at least one final injection is carried out in a dosing manner only when the valve lift has actually been carried out. Therefore, it can easily be ensured in this manner that no misfiring or combustion with very high fuel excess takes place, therefore, a considerably larger amount of fuel than the stoichiometric air/fuel ratio occurs even if it is very difficult to predict when an actual valve lift will pass from one value to the other value.

In an advantageous embodiment of the method for controlling the internal combustion engine, fuel is metered at least once during the intake stroke of a cylinder and the amount of fuel is determined depending on whether or not the passage of the valve lift from one value to the other value has actually been carried out. This has the advantage that it is very easy to implement.

In an additional advantageous embodiment of the method for controlling an internal combustion engine, fuel is metered at least once during the intake stroke of a cylinder without taking into consideration whether or not the passage of the valve lift from one value to the other value has actually been carried out. Because of this a proper preparation of the air/fuel mixture can be guaranteed, the requirement being a proper combustion process and accordingly low emissions of noxious substances of the internal combustion engine.

In an additional advantageous embodiment of the method, at least one final injection is carried out in a dosing manner only when the valve lift passage from one value to the other value has actually been carried out. Because of this, a very advantageous mixture preparation can simply be guaranteed, on the one hand, if the value with a lower valve lift was actually set and, therefore, low emissions of noxious substances were ensured. On the other hand, a desired air/fuel ratio can also be set if the value with a higher valve lift has actually been set.

In an additional advantageous embodiment of the method, the amount of fuel which is metered without taking into consideration whether or not the passage of the valve lift from one value to the other value has actually been carried out, is determined in such a way that there is a desired air/fuel ratio when the valve lift has actually been carried out with the value with a lower valve lift. Because of this, the mixture can simply be prepared very thoroughly and an air/fuel ratio can be set exactly if the value has actually been set with a lower lift.

In an additional advantageous embodiment of the method, the amount of fuel which is metered without taking into consideration whether or not the passage of the valve lift from one value to the other value has actually been carried out, is determined in such a way that the amount of fuel is higher than the desired air/fuel ratio if the valve lift has actually been carried out with the value with a lower valve lift. This has the advantage of an improved mixture preparation if the value with a higher valve lift has actually been set.

In an additional advantageous embodiment of the method, fuel is metered at least once during the intake stroke of a cylinder, when the valve lift passes from one value to the other and at least one final injection is carried out in a dosing manner only when the valve lift has actually been carried out if the rotational speed is greater than a predetermined threshold value which preferably is approximately 2000 revolutions per minute. This has the advantage that, on the one hand, the cost of determining the amount of fuel to be metered is reduced to below this threshold value and, on the other hand, surprisingly enough, the probability that the valve lift will not pass to another value is considerably higher for rotational speeds exceeding the predetermined threshold value than for rotational speeds below the predetermined threshold value and therefore the risk of misfiring is small.

In an additional advantageous embodiment of the method, the ignition angle is adapted depending on a variable which characterizes the metering of fuel and which depends on whether or not the valve lift passage from one value to the other value has actually been carried out. This has the advantage that a possibly poorer mixture preparation can be taken into consideration when setting the ignition angle and indeed in such a way that lower emissions of noxious substances are guaranteed.

An additional advantageous embodiment of the method is the variable of the amount of fuel and/or the crankshaft angle of metering the fuel, which depends on whether or not the valve lift passage from one value to the other value has actually been carried out. This has the advantage that these variables are characteristic of the mixture preparation.

BRIEF DESCRIPTION OF THE DRAWINGS

The invention is explained in detail below as an embodiment on the basis of the accompanying drawings. They are as follows.

DETAILED DESCRIPTION OF THE INVENTION

Elements with the same design and function are characterized in all the figures with the same reference symbols.

Figure 1:
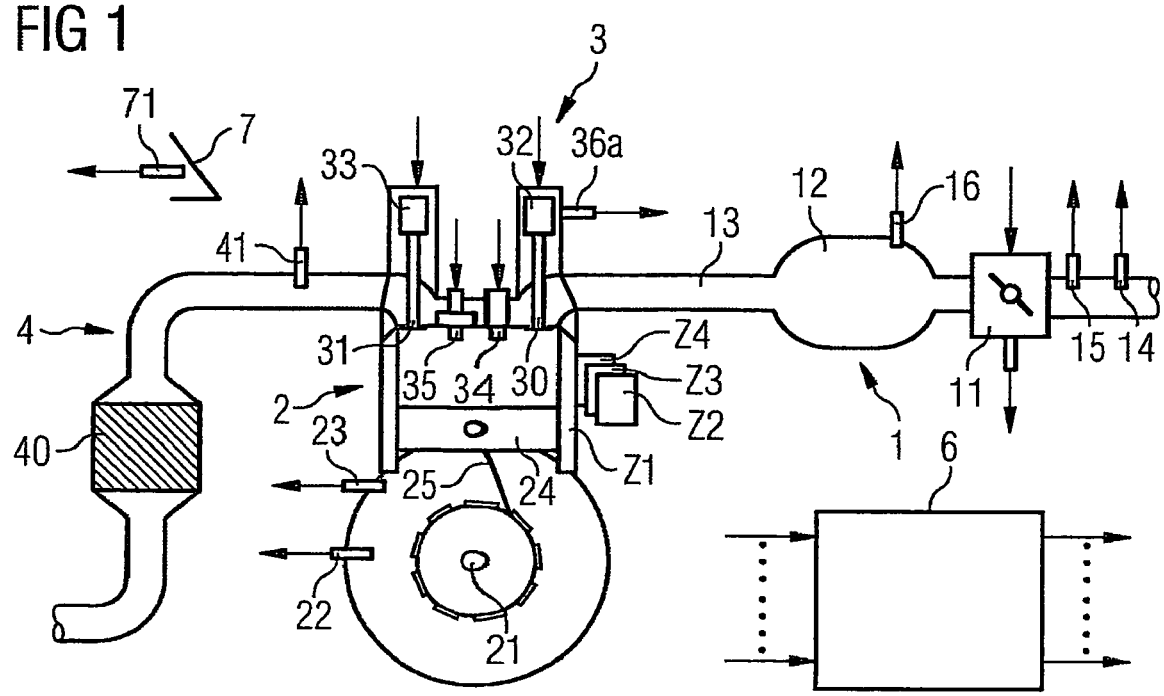
FIG. 1 an internal combustion engine with a control unit.

An internal combustion engine (FIG. 1) includes an intake tract 1, an engine block 2, a cylinder head 3 and an exhaust gas tract 4. The intake tract preferably includes a throttle valve 11, a manifold 12 and an intake pipe 13, which is guided to a cylinder Z1 via an intake port in the engine block. The engine block also includes a crankshaft 21, which is connected to the piston 24 of a cylinder Z1 by means of a connecting rod 25.

Figure 2:
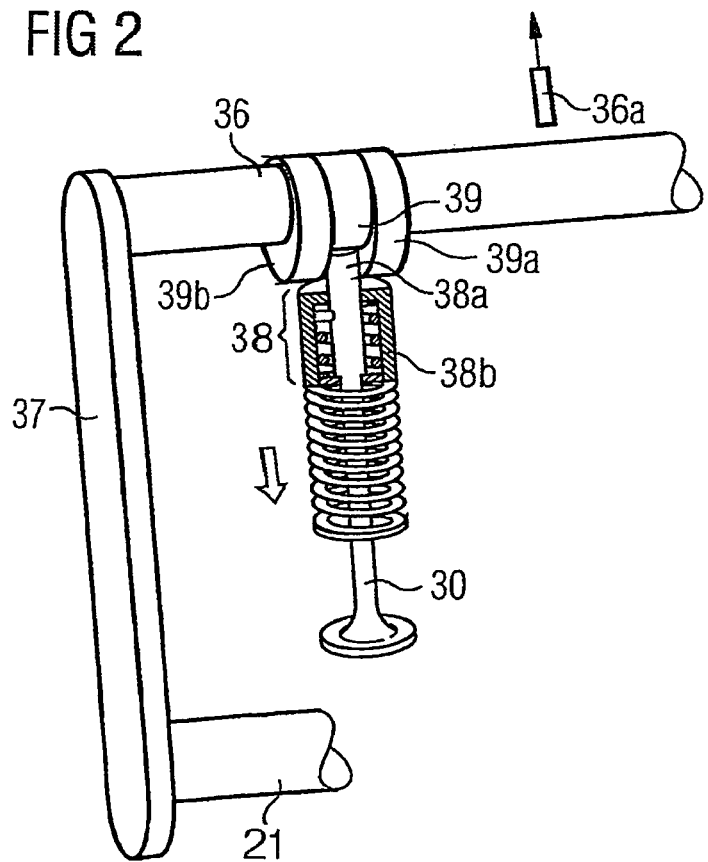
FIG. 2 an additional view of parts of the internal combustion engine in accordance with FIG. 1, FIG. 3 a flowchart of a first embodiment of a program for controlling an internal combustion engine for a desired passage of the valve lift from a lower valve lift to a higher valve lift, FIG. 4 a flowchart of the program in accordance with FIG. 3 for controlling an internal combustion engine for a desired passage of the valve lift from a higher valve lift to a lower valve lift and FIGS. 5 and 6 an additional embodiment of a program for controlling an internal combustion engine.

The cylinder head includes a drive with an intake valve 30, an exhaust valve 31 and valve gears 32, 33. The gas intake valve 30 and the gas exhaust valve 31 are driven by means of a camshaft 36 (see FIG. 2) on which cams 39, 39a and 39b are embodied for driving the gas intake valve 30. In addition, cams which are not shown are provided on an additional camshaft which drive the gas intake valve 31.

A total of three cams 39, 39a, 39b (FIG. 2) are allocated to the gas intake valve 30. The cams 39, 39a, 39b drive the gas-changing valve 30 via a transfer unit 38. The transfer unit 38 is embodied as a cup-shaped tappet. It includes a cylinder element 38a and a ring cylinder element 38b arranged concentrically to the cylinder element. A cam 39 drives the cylinder element 38a. The cams 39a, 39b drive the ring cylinder element 38b. In a switching position of the cup-shaped tappet, only the lift of the cam 39, which is lower than the cam 39a and b, is transferred to the gas intake valve 30. In an additional switching position of the cup-shaped tappet, the lifts of the cams 39a and b are transferred to the gas intake valve 30. The switching position of the cup-shaped tappet can be achieved by a corresponding activation of an actuator provided in the cup-shaped tappet and preferably takes place hydraulically.

However, the drive 31, 32 can also be embodied in an alternative way. The camshaft can for example be embodied in such a way and engage with an actuator so that, depending on the desired valve lift, different cams drive the gas changing-valve.

The cylinder head 3 (FIG. 1) also includes both an injection valve 34 and a spark plug 35. Alternatively, the injection valve can also be arranged in the intake pipe 13.

The exhaust gas tract 4 includes a catalytic converter 40. From the exhaust gas tract 4, an exhaust recirculation line can be guided to the intake tract 1, particularly to the manifold 12.

In addition, a control unit 6 is provided to which sensors have been allocated, said sensors detecting the different measured quantities and in each case determining the measured value of the measured quantity. The control unit 6 determines, in accordance with at least one of the measured quantities, the controlling variables which are then converted into one or several adjusting signals for controlling the final control elements by means of corresponding actuators.

The sensors are a pedal position indicator 71 which detects the position of an acceleration pedal 7, an air mass flow meter 14 which detects an air mass flow upstream of the throttle valve 11, a temperature sensor 15 which detects the intake air temperature, a pressure sensor 16 which detects the intake pipe pressure, a crankshaft angle sensor 22 which detects a crankshaft angle to which a rotational speed N is allocated, a further temperature sensor 23 which detects a coolant temperature, a camshaft angle sensor 36 which detects the camshaft angle, a further temperature sensor which detects an oil temperature and an oxygen sensor 41 which detects a residual oxygen content of the exhaust gas and, if required, a sensor which detects whether or not the gas intake valve 30 is operated with a lower or a higher valve lift. Depending on the embodiment of the invention, there can be any subset of the mentioned sensors or even additional sensors.

The final control elements are, for example, the throttle valve 11, the gas intake and the gas exhaust valves 30, 31, the injection valve 34, the spark plug 35, the setting mechanism 37 or the transfer unit 38.

In addition to the cylinder Z1, the internal combustion engine can also have other cylinders, namely the cylinders Z2, Z3, Z4 to which corresponding sensors and final control elements are allocated and controlled accordingly. The control unit 6 conforms to a device for controlling the internal combustion engine.

A program for controlling the internal combustion engine is preferably started when the internal combustion engine is started. The start takes place in a first step S1 (FIG. 3), in which variables are initialized, if required.

In a step S2, a test is performed to determine whether or not the current rotational speed N is greater than a predetermined threshold value N_THR of the rotational speed, which preferably is approximately 2000 revolutions per minute. If the condition of step S2 has not been met, a third amount of fuel MFF3 is determined in a step S6 with due consideration of the air mass in the cylinder to be expected for this operating cycle, in which case for this purpose the desired step of the valve lift VL is used as a basis and with due consideration of the air/fuel ratio to be set. In addition, the metering of the third amount of fuel MFF3 is then controlled in a step S6.

On the other hand, if the condition of a step S2 has been met, a test is then performed in a step S4 to determine whether or not since the last operating cycle of the cylinder Z1, a passage of the valve lift VL from a lower valve lift LO to a higher valve lift HI was requested.

If this is not the case, processing will continue in a step S6. Subsequently to a step S6, the processing will be continued in a step S8 in which an ignition angle IGN is then determined depending on the rotational speed N, a desired torque TQ_REQ and, if required, additional variables. In this way, for example, instead of the desired torque TQ_REQ, another variable representing the load of the internal combustion engine can also be used. In addition, the ignition angle IGN can also be determined depending on additional variables with regard to the desired minimizing of emissions of noxious substances such as NOX emissions.

The program then remains in a step S10 for a predetermined waiting period T_W or also for a predetermined crankshaft angle before processing is continued anew in a step S2.

On the other hand, if the condition of a step S4 is met, a first amount of fuel MFF1 is determined in a step S12 and the first amount of fuel MFF1 is for example determined in such a way that a desired air/fuel ratio has been set in the cylinder Z1, on the condition that the valve lift VL of the gas intake valve 30 is lower than in the current intake stroke of the lower valve lift LO. In addition, the actual metering of the first amount of fuel MFF1 is then controlled in a step S12. Alternatively, in a step S12, the first amount of fuel MFF1 can then also be selected in such a way that there is a higher amount of fuel in the cylinder Z1 than the desired air/fuel ratio, on the condition that the valve lift VL of the gas intake valve 30 is the lower valve lift LO.

The program then remains in a step S14 for a predetermined waiting period T_W, which can differ from that of step S10. The waiting period T_W in a step S14 preferably has to be metered in such a way that in the case of a subsequent processing of a step S16 it is possible to determine whether or not the valve lift VL in the current intake lift is actually the lower valve lift LO or actually the higher valve lift HI. However, it is metered so low that a step S16 can possibly be finished early.

The actual valve lift VL is preferably either determined by means of the suitable sensor or in a simple embodiment the passage from a lower valve lift LO to a higher valve lift HI can take place on the basis of the curve of the intake pipe pressure or also on the basis of the curve of a hydraulic pressure, in the case in which the passage takes place hydraulically or is also detected on the basis of electrical signals if the passage takes place electrically. In this way, it is for example possible to determine on the basis of the actual curve of the intake pipe pressure, while the gas intake valve 30 is in its open position, by comparing with corresponding values for the lower valve lift LO and/or the higher valve lift HI, whether or not the actual lower valve lift LO or the higher valve lift HI has been set.

If it is detected in a step S16 that the actual valve lift VL is the lower valve lift LO, processing will be continued in a step S8.

On the other hand, if it is detected in a step S16 that the actual valve lift VL is the higher valve lift HI, a second amount of fuel MFF2 is then determined in a step S18. The second amount of fuel MFF2 is then determined in such a way that the sum of the first and the second amount of fuel MFF1, MFF2 corresponds with the desired air/fuel ratio in the cylinder Z1 in the case of the higher valve lift HI. In addition, the metering of the second amount of fuel MFF2 is controlled in a step S18.

A correction value IGN_COR is then determined in a step S20 for the ignition angle IGN and indeed depending on the second amount of fuel and/or the crankshaft angle CRK_MFF2 of the metering of the second amount of fuel MFF2. Because of this correction value, the quality of the mixture preparation, which has possibly decreased because of the metering of the second amount of fuel MFF2 occurring only at a later stage, can be determined and in this way by influencing the ignition angle IGN the minimizing of emissions of noxious substances can be ensured.

The ignition angle IGN is then determined in a step S22 depending on the correction value IGN_COR, the rotational speed, the desired torque TQ_REQ and, if required, additional or alternative variables, which the specialist then uses for this purpose. In addition, in a step S22, the ignition of the air/fuel mixture in the cylinder Z1 is controlled. The processing is then continued in a step S10. The waiting period T_W in a step S10 should preferably be metered in such a way that subsequent to a step 50, the processing is then continued in a step S2 if a new operating cycle of the cylinder Z1 has started.

If in a step S12, the first amount of fuel MFF1 is determined in such a way that the desired air/fuel ratio has been set for the lower valve lift, it is ensured that the emissions of noxious substances in the case of an actual non-executed passage of the valve lift from the lower valve lift LO to the higher valve lift HI is minimized. On the other hand, if in the case of a step S12, a first amount of fuel MFF1 increased for this purpose has been determined, this indeed still causes increased emissions of noxious substances in the case where a passage from the lower valve lift LO to the higher valve lift HI did not actually take place. This has the advantage that in the case of a possibly more probable actual passage from a lower valve lift LO to a higher valve lift HI, an improved mixture preparation based on the earlier metering of a higher first amount of fuel MFF1 is guaranteed.

Tests have shown that the reason for a deviation between the desired and the actually set valve lift VL, for example, in the case of a hydraulic system can be a foaming-up of the hydraulic fluid while operating the internal combustion engine. Gas bubbles in this foamed-up fluid lead to a changed compressibility of the fluid which, on the other hand, can lead to the fact that a desired passage did not place in good time. Surprisingly, however, this foaming-up occurred strongly, in particular, above the threshold value N_THR.

Figure 3:
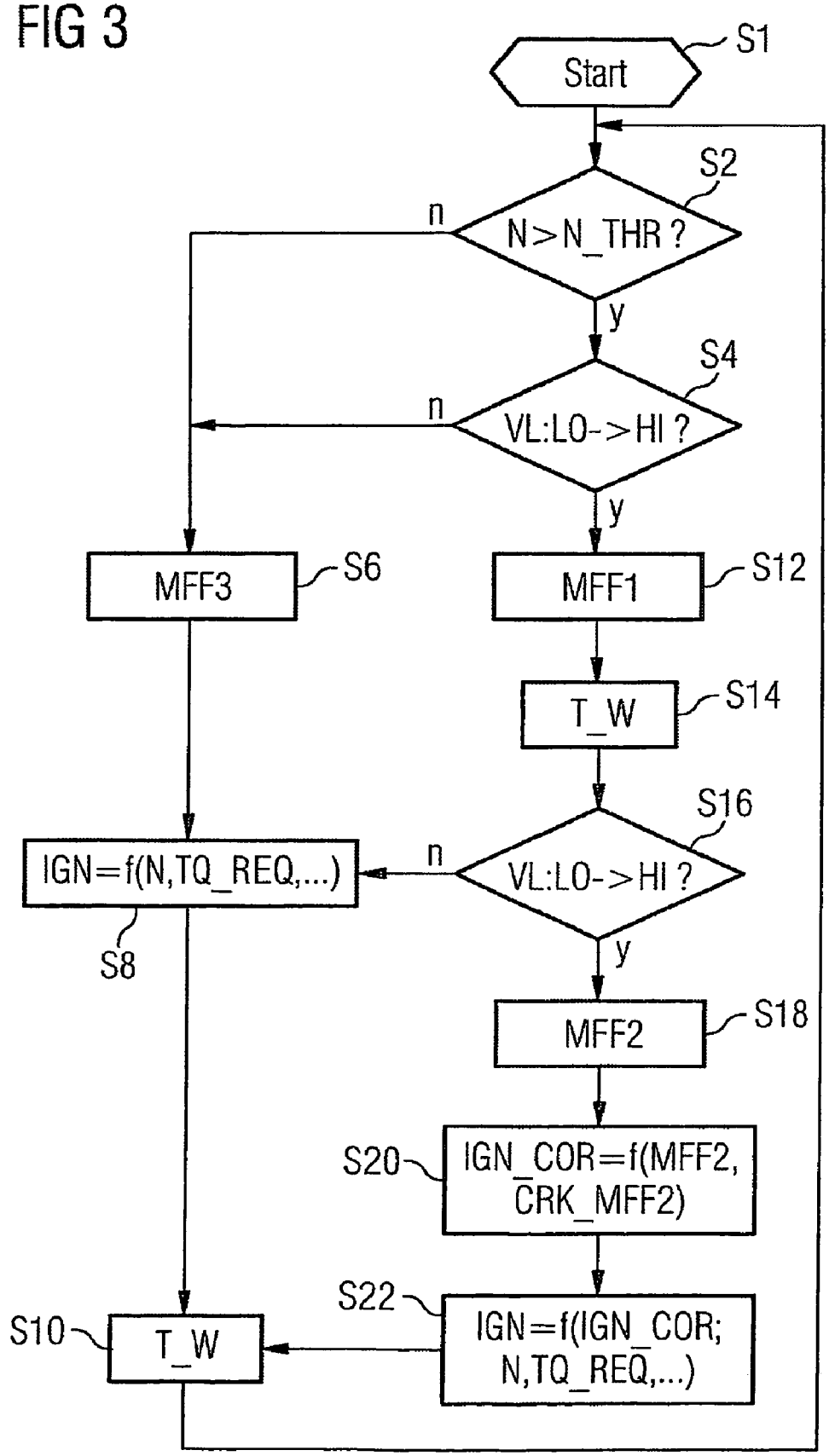
Figure 4:
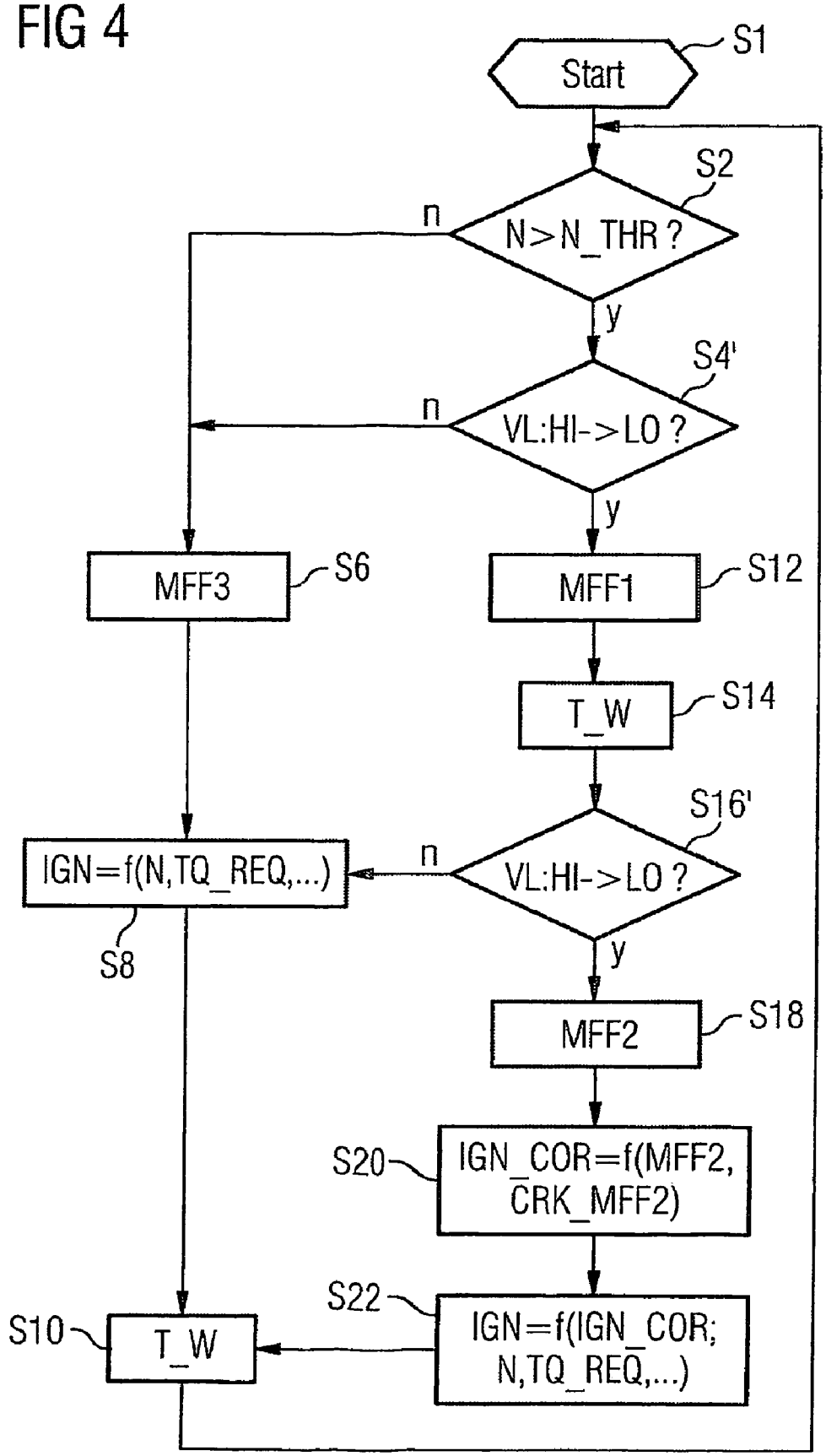

The embodiment of the program for controlling an internal combustion engine in accordance with FIG. 4 differs from that in accordance with FIG. 3 in that in a step S4' a test is performed to determine whether or not a passage of the valve lift VL from the higher valve lift HI to the lower valve lift LO was requested. In addition, a test is carried out in a step S16' to determine whether or not the actual valve lift VL passed from a higher valve lift HI to a lower valve lift LO. The programs in accordance with the FIGS. 3 and 4 are preferably finished parallel to each other.

FIGS. 5 and 6 show an alternative embodiment of the program in accordance with FIG. 3, in which case likewise only the steps which differ from those in accordance with FIG. 3 are described. A step S4 is followed by a step S26 in which the program for the waiting period T_W remains when change of the valve lift VL from the lower valve lift LO to the higher valve HI is requested. The waiting period T_W is selected in a step S26 in such a way that a subsequent step S28 is finished if it can be determined whether or not the valve lift VL actually passed from the lower valve lift LO to the higher valve lift. On the other hand, the waiting period T_W of step S26 is selected in such a way that a step S28 is finished as early as possible.

In a step S28 a test is then performed to determine whether or not the actual valve lift VL has changed from the lower valve lift LO up to the higher valve lift HI.

If this is the case, then in a step S30 the sum of the first and second amount of fuel MFF1, MFF2 is determined and a metering of the sum of the first and second amount of fuel MFF1, MFF2 is controlled. In this way, the metering of both the first and the second amount of fuel MFF1, MFF2, in this case, only takes place in a period of time, in which it already has been specified whether or not the actual valve lift VL has changed from the lower valve lift LO to the higher valve lift HI. In this case, the amount of fuel required for the desired air/fuel ratio can always be metered reliably in this manner.

The correction value IGN_COR is then determined in a step S32 depending on the sum of the first and the second amount of fuel MFF1, MFF2 and/or the crankshaft angle CRK_MFF12 of the metering of the amount of fuel in the cylinder Z1. The ignition angle IGN is then determined in a step S34 depending on the correction value IGN_COR, the rotational speed N, the desired torque TQ_REQ and, if required, additional variables or alternatively from other variables.

On the other hand, if the condition of a step S28 has not been met, i.e. the actual valve lift VL from the lower valve lift LO to the higher valve lift HI has not changed, the first amount of fuel MFF1 is determined in a step S38.

The correction value IGN_COR of the ignition angle IGN is then determined in a step S40 depending on the first amount of fuel MFF1 and/or the crankshaft angle CRK_MFF1 of the metering of the first amount of fuel MFF1 in the cylinder Z1.

The ignition angle IGN is then determined in a step S42 depending on the correction value IGN_COR, the rotational speed N, the desired torque TQ_REQ and additional variables or alternative variables and the ignition is then controlled in the case of the predetermined ignition angle IGN.

On the other hand, in all the embodiments the metering of the first, the second and the third amount of fuel MFF1, MFF2, MFF3 can again be divided into more than one actual injection. Corresponding programs are also finished for the additional cylinders Z2-Z4.

The invention claimed is:

1. A method for controlling an internal combustion engine, comprising:
    metering a fuel at least once during an intake stroke of a cylinder when a valve lift passes from one value to another value; and
    carrying out one final injection in a dosing manner only when the valve lift has actually been carried out,
    wherein in fuel is metered at least once during the intake stroke of a cylinder, when the valve lift passes from one value to the other and at least one final injection is carried out in a dosing manner only when the valve lift has actually been carried out if the rotational speed is greater than a predetermined threshold value,
    wherein the predetermined threshold value is approximately 2000 revolutions per minute.

2. The method in accordance with claim 1, wherein fuel is metered at least once during the intake stroke of a cylinder without taking into consideration whether or not the passage of the valve lift from one value to the other value has actually been carried out.

3. The method in accordance with claim 1, wherein at least one final injection is carried out in a dosing manner only when the valve lift passage from one value to the other value has actually been carried out.

4. The method in accordance with claim 1, wherein the amount of fuel which is metered without taking into consideration whether or not the passage of the valve lift from one value to another value has actually been carried out is determined in such a way that there is a desired air/fuel ratio when the valve lift has actually been carried out with the value with a lower valve lift.

5. The method in accordance with claim 1, wherein the amount of fuel that is metered without taking into consideration whether or not the passage of the valve lift from one value to the other value has actually been carried out is determined in such a way that the amount of fuel is higher than the desired air/fuel ratio if the valve lift has actually been carried out with the value with a lower valve lift.

6. The method in accordance with claim 1, wherein fuel is metered once during the intake stroke of a cylinder, when the valve lift passes from one value to the other and at least one final injection is carried out in a dosing manner only when the valve lift has actually been carried out.

7. The method in accordance with claim 1, wherein an ignition angle is adapted depending on a variable which characterizes the metering of fuel and which depends on whether or not the valve lift passage from one value to the other value has actually been carried out.

8. The method in accordance with claim 7, wherein the variable is the amount of fuel and/or the crankshaft angle of the metering of the fuel, which depends on whether or not the valve lift passage from one value to the other value has actually been carried out.

9. A device for controlling an internal combustion engine, comprising:
    a drive for a gas intake valve by a valve lift of the gas intake valve that can be set for at least two values;
    an injection valve which meters a fuel; and
    a spark plug which controls a crankshaft angle of the air/fuel mixture ignition,
    wherein the device ensures that fuel is metered at least once during the intake stroke of a cylinder when the valve lift passes from one value to another and that at least one final injection is carried out in a dosing manner only when the valve lift has actually been carried out,
    wherein in fuel is metered at least once during the intake stroke of a cylinder, when the valve lift passes from one value to the other and at least one final injection is carried out in a dosing manner only when the valve lift has actually been carried out if the rotational speed is greater than a predetermined threshold value,
    wherein the threshold value is approximately 2000 revolutions per minute.

* * * * *